(12) United States Patent
Lee et al.

(10) Patent No.: US 8,174,341 B2
(45) Date of Patent: *May 8, 2012

(54) THIN FILM BASED SPLIT RESONATOR TUNABLE METAMATERIAL

(75) Inventors: Jae Seung Lee, Ann Arbor, MI (US); Serdar H. Yonak, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/325,748

(22) Filed: Dec. 1, 2008

(65) Prior Publication Data
US 2010/0134215 A1     Jun. 3, 2010

(51) Int. Cl.
*H01P 7/08*     (2006.01)
(52) U.S. Cl. ........................................ 333/219; 333/235
(58) Field of Classification Search ............. 333/205, 333/235, 231, 219, 204; 359/244, 321, 241, 359/240; 343/753, 909
See application file for complete search history.

(56) References Cited

U.S. PATENT DOCUMENTS

| | | | |
|---|---|---|---|
| 5,057,803 A * | 10/1991 | Ooi et al. | 333/204 |
| 6,717,491 B2 * | 4/2004 | Liang et al. | 333/205 |
| 7,525,711 B1 * | 4/2009 | Rule et al. | 359/244 |
| 7,532,397 B2 * | 5/2009 | Tanaka et al. | 359/485.02 |
| 7,570,432 B1 * | 8/2009 | Yonak | 359/652 |
| 7,889,127 B2 * | 2/2011 | Sajuyigbe et al. | 342/372 |
| 2007/0188385 A1 | 8/2007 | Hyde et al. | |
| 2008/0048917 A1 | 2/2008 | Achour et al. | |
| 2008/0136563 A1 | 6/2008 | Duwel et al. | |
| 2008/0165079 A1 | 7/2008 | Smith et al. | |
| 2009/0206944 A1 * | 8/2009 | Rofougaran et al. | 333/17.3 |
| 2009/0262766 A1 * | 10/2009 | Chen et al. | 372/26 |
| 2010/0156573 A1 * | 6/2010 | Smith et al. | 333/239 |
| 2010/0220035 A1 * | 9/2010 | Lee et al. | 343/909 |

FOREIGN PATENT DOCUMENTS

WO     WO 2006023195 A2 *     3/2006

OTHER PUBLICATIONS

Schurig, D. et al., Electric-field-coupled resonators for negative permittivity metamaterials, *Applied Physics Letters*, 88:041109, 2006.

* cited by examiner

*Primary Examiner* — Dean O Takaoka
*Assistant Examiner* — Alan Wong
(74) *Attorney, Agent, or Firm* — Gifford, Krass, Sprinkle, Anderson & Citkowski, P.C.

(57) ABSTRACT

A metamaterial comprises a substrate and a plurality of resonators supported by the substrate, each resonator including a first conducting segment and a second conducting segment, there being at least one adjustable capacitor and at least one bias capacitor located between the first and second conducting segments. In some examples, the first conducting segment, second conducting segment, bias capacitor, and adjustable capacitor are substantially coplanar and may be formed by patterning a metal film supported by the substrate. Bias lines may be configured so as to allow a bias potential to be applied between the first and second conducting segments so as to vary the capacitance of the adjustable capacitor.

18 Claims, 4 Drawing Sheets

THIN FILM BASED SPLIT RESONATOR TUNABLE METAMATERIAL

FIELD OF THE INVENTION

The invention relates to metamaterials, such as tunable metamaterials.

BACKGROUND OF THE INVENTION

Metamaterials include composite materials comprising conductive elements and dielectric materials. Metamaterial prompters typically depend on structural features of the conducting materials. However, tunable metamaterials would be very useful for numerous applications.

SUMMARY OF THE INVENTION

An example metamaterial comprises a substrate, such as a dielectric substrate, and a plurality of resonators supported on the substrate. The resonators may be electrically coupled inductor-capacitor (ELC) resonators. In some examples of the present invention, each resonator comprises first and second conducting segments. At least one adjustable capacitor is located between the first and second conducting segments, and further, at least one bias capacitor is located between the conducting segments. An electrical potential (which may be termed a bias potential) applied between the first and second conducting segments can then be used to adjust the capacitance of the adjustable capacitor. For example, the adjustable capacitor may include a material having an electrically tunable permittivity, such as a ferroelectric, for example barium strontium titanate (BST).

A bias capacitor may be provided so as to electrically isolate the first and second conducting segments from each other, for an applied direct voltage. A metamaterial may comprise a plurality of ELC resonators supported by dielectric substrate. The bias capacitors may have the same capacitance for all resonators disposed on the substrate. However, in other examples the value of the bias capacitors varies with spatial position, for example having a linear or other dependence on spatial position, so as to give a gradient index even with no field applied, and the gradient index may then be adjusted using the bias potential.

In some examples, the first and second conducting segments have a generally "E" shaped form, having three generally parallel arms. The E shapes are arranged face to face, and capacitors are located between the proximate metal strips. For example, the first and second conducting segments may be separated by a bias capacitor between the central arm of each E-shape, with adjustable capacitors between the other (outer) arms of the E shapes. However, other configurations are possible, for example using two bias capacitors and one adjustable capacitor.

Examples of the present invention are not limited to resonators on a planar substrate. Examples also include resonators aligned in other directions, for example within three dimensional metamaterial designs. For example metamaterials may comprise configurations of electrically conducting rods, and/or other conducting shapes, with bias capacitors and adjustable capacitors being arranged between the rods or other conducting shapes. Also, substrates may be curved and/or flexible.

Examples of the present invention include a metamaterial comprising a substrate, in particular a planar dielectric substrate. The substrate may be a polymeric material, for example a liquid crystal polymer, or other dielectric material such as an oxide, glass, ceramic, and the like. A plurality of resonators may be disposed on at least one side of the substrate, for example in a generally square array pattern. Each resonator may include first and second conducting segments, at least one adjustable capacitor between the first and second conducting segments, and at least one bias capacitor between the first and second conducting segments. An electric potential applied between the first and second segments induces an adjustment of the capacitance of the adjustable capacitor, whereas the capacitance of the bias capacitor is substantially unaltered by the electric potential.

The first and second conducting segments, together with capacitive elements, may form at least one resonant loop structure. The equivalent circuit at operational frequencies may comprise an inductive component and a capacitive component. The capacitive component may be varied by an electric potential through adjustment of the adjustable capacitor. The capacitive component of the equivalent circuit may include contributions from the adjustable capacitor and a bias capacitor, giving an adjustable variation of resonant frequency.

DETAILED DESCRIPTION OF THE PREFERRED EMBODIMENTS

An example metamaterial comprises a substrate and a plurality of resonators supported by the substrate, each resonator including a first conducting segment and a second conducting segment, there being at least one adjustable capacitor and at least one bias capacitor located between the first and second conducting segments. In some examples, the first conducting segment, second conducting segment, bias capacitor, and adjustable capacitor are substantially coplanar and may be formed by patterning a metal film supported by the substrate. In some examples, a single process step may be used to form the resonator structure, including a bias capacitor and the electrodes of an adjustable capacitor, and a second process step is used to deposit a voltage-dependent permittivity medium between the electrodes of the adjustable capacitor. Bias lines may be configured to allow a bias potential to be applied between the first and second conducting segments, so as to vary the capacitance of the adjustable capacitor due to the voltage-dependent permittivity.

Examples of the present invention include thin film based split resonator tunable metamaterials. Resonators are electrically split (for DC signals) into first and second conducting segments, comprising planar thin films of electrical conductor such as a patterned metal film. A simple bias feed network can be used to apply an electrical potential across an adjustable capacitor within each tunable resonator.

An example metamaterial includes a plurality of resonators, for example electrically coupled inductor-capacitor (ELC) resonators. Some or all of the resonators may be active resonators, having electromagnetic properties that may be modified using an applied electric field. For example, an active resonator may comprise a thin film voltage controlled capacitor. The resonant frequency of an active resonator may be tuned as a function of applied electric field. Variation of the resonant frequency allows change in effective refractive index at an operating frequency.

Examples of the present invention include tunable metamaterials having a simple bias potential feed network. Bias lines connected to each resonator may be configured so as to not substantially interfere with electromagnetic wave transmission through the metamaterial. For example, the bias lines may be orthogonal to the electric field vector of the electromagnetic wave.

Each resonator may comprise a plurality of conducting segments, and at least two conducting segments of the resonator are electrically isolated from each other using a bias capacitor. Application of a bias potential between the conducting segments isolated from each other by the bias capacitor allows control of an adjustable capacitor, for example an adjustable capacitor comprising a material having a voltage tunable permittivity, such as a ferroelectric, for example a titanate, such as barium strontium titanate (BST).

For example, a resonator may comprise first and second conducting segments, electrically isolated from each other using a bias capacitor. The first and second conducting segments can be used as electrodes for application of an electric field across an electrically tunable medium within an adjustable capacitor. In some examples, a central arm of a resonator includes a bias capacitor, and outer arms include voltage-adjustable capacitors.

In some examples of the present invention, the bias capacitor is a planar interdigitated capacitor. For example, a resonator can be fabricated using a planar bias capacitor and at least one planar adjustable capacitor. This allows simplification of the fabrication of the resonator. For example, the conducting elements of the metamaterial may be generally planar, and may be deposited in a single processing step. The conducting elements may be formed from a single conducting sheet, for example by etching or other patterning process. A voltage tunable material may be deposited in a second process step, and may be generally coplanar with the conducting segments.

A bias capacitor may be an interdigitated capacitor, comprising interlocking comb-shaped forms provided by portions of the first and second conducting segments. For example, the first and second conducting segments may be separated by an airgap that follows a square-wave type path between interdigitated electrodes formed by opposed ends of portions of the first and second conducting segments.

In a conventional ELC resonator structure, there is typically at least one capacitor. However, an electrically conducting track runs from one side of the capacitor to the other. Hence, application of an electric field across the adjustable capacitor cannot easily be achieved using the conducting portions of the metamaterial, and external electrodes may be required. Further, the use of external electrodes complicate the fabrication of the device and may complicate the arrangement of a bias feed network used to apply an electric potential across the voltage tunable medium of the adjustable capacitor. However, in examples of the present invention, conducting segments present as part of the resonator or arm may also be used as electrodes for application of an electric potential across the adjustable capacitor. A bias feed network, for example comprising pairs of bias feed lines, may be used to electrically interconnect conducting segments of adjacent unit cells. For example, a column of unit cells may be electrically interconnected using first and second bias lines so as to allow application of an electric potential across all tunable elements within that column. In some examples, a bias line may be used to provide a bias potential to the first conducting segment, and the second conducting segment may be connected to ground or an opposite potential.

Hence, some examples of the present invention simplify resonator structure design, and allow tuning of a metamaterial using a single layer of electrically conducting elements. There is no need for additional layers of electrodes for application of tuning fields.

The use of an interdigitated bias capacitor allows fabrication of a planar capacitor that allows functioning of the unit cell but at the same time electrically isolates first and second conducting segments. The interdigitated capacitor may be configured so as to not significantly compromise the performance of the metamaterial.

The orientation of the bias lines may be configured to be generally orthogonal to the electric field components of incident electromagnetic radiation. In such a configuration, the bias lines may have little effect on transmitted or reflected radiation.

In some examples of the present invention, conducting elements are formed as metal films, such as copper films, on a dielectric substrate. The metamaterial may be fabricated using conventional printed circuit board application methods. A tunable material, such as a ferroelectric material, may be deposited so as to be also generally co-planar with the conducting elements. Hence, the metamaterial has a generally planar configuration and no structure, beyond the thickness of deposited layers is required in the direction orthogonal to the substrate surface. Hence, the use of a planar interdigitated split ELC resonator allows a simple process to be used at fabrication, and further allows bias lines to a voltage source and ground connection to not disturb electromagnetic wave propagation through the metamaterials.

Figure 1:
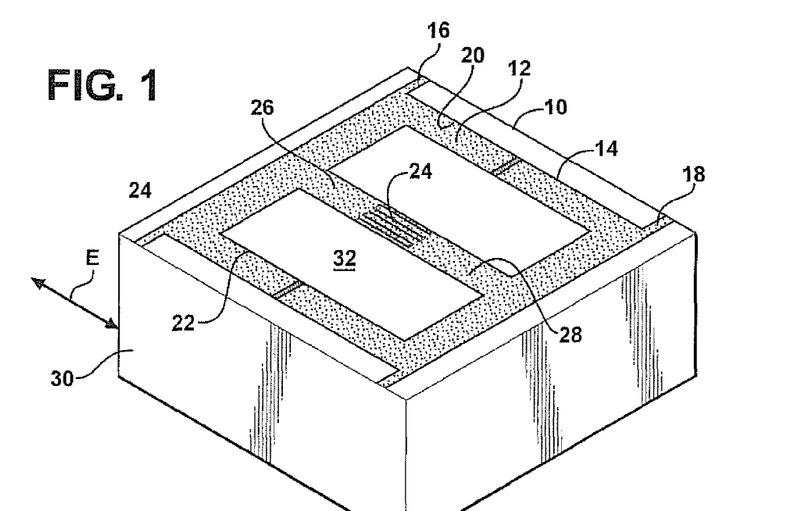
FIG. 1 shows a view of a unit cell of an example metamaterial.

FIG. 1 shows a unit cell of a metamaterial comprising a substrate and an ELC resonator. In this example, the resonator comprises first and second conducting segments 12 and 14 respectively. Bias connections 16 and 18 electrically connect to the first and second conducting segments. These bias connections may interconnect a plurality of adjacent unit cells. Adjustable capacitors 20 and 22 have capacitances that can be adjusted through application of an electrical field between the bias connections. In a conventional ELC resonator, the first and second segments would be electrically interconnected through the central arm. However in an improved resonator, the central arm comprises first and second electrical strips 26 and 28 and interdigitated capacitor 24. The interdigitated bias capacitor 24 isolates the first and second segments, with respect to direct potentials. However, this capacitor need not compromise the performance of the resonator at the high frequencies used for operation of the metamaterial. The conducting segment may be formed by a simple process, such as etching of a planar conducting film, for example a conventional printed circuit board (PCB) fabrication process. The conducting segment is supported on the surface 32 of a substrate 30.

For evaluation of these structures using computer simulations, the substrate was taken to be a Pyrex™ substrate. However, any suitable substrate may be used, for example any dielectric medium such as a polymer, in particular a low loss RF polymer such as a liquid crystal polymer.

Figure 2A:
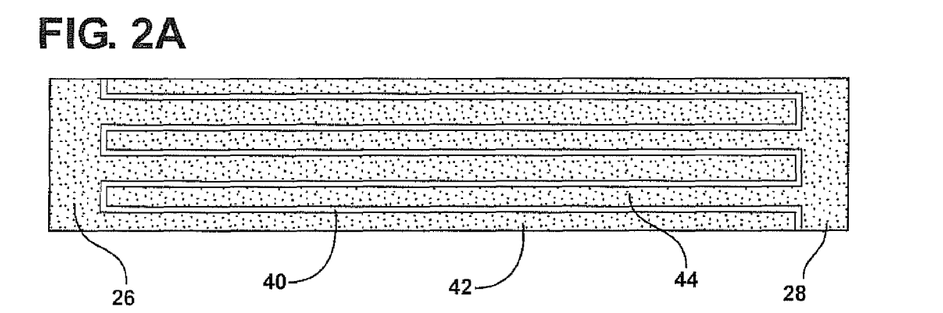
FIG. 2A illustrates a possible configuration for a bias capacitor.

FIG. 2A shows a more detailed view of the interdigitated capacitor 24. Elongated portions of the respective conducting tracks 26 and 28, shown at 42 and 44 respectively, are separated by an air gap 40. The air gap takes an elongated path through the central arm of the resonator, and electrically isolates the first segment from the second segment. Other configurations of the bias capacitor are possible. In this example, there are three interdigitated fingers extending from portions of the central arm provided by each conducting segment. In other examples, the number of fingers extending from either conducting segment may be in the range 1-10 inclusive, and the number of fingers need not be the same for each conducting segment. In this example, the air gap has a majority of its length aligned in a direction parallel to the direction of elongation of the resonator arm in which it is located, and along a direction that is normal to general alignment of the bias lines.

Figure 2B:
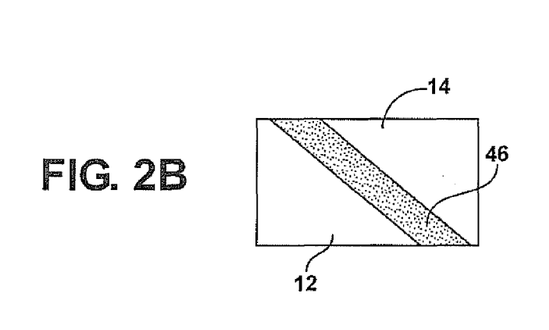
FIG. 2B shows a possible configuration for an adjustable capacitor.

FIG. 2B shows a detailed view of the adjustable capacitor 20, including a thin film of a material 46 having an electrically tunable permittivity. For example, the adjustable capacitor may be a planar thin film capacitor comprising a thin strip of barium strontium titanate (BST).

Hence, in this example the resonator comprises two thin film adjustable capacitors, comprising BST, the adjustable capacitors located proximate each side of the resonator structure in the outer arms. An interdigitated capacitor 24 in the central arm of the resonator provides electrical isolation of the first and second conducting segments. Proximate each corner of the unit cell illustrated, bias lines connect to the adjacent unit cell. The bias lines can be configured to be orthogonal to the plane of electric field polarization direction so there is little disturbance to waive propagation.

Figure 3:
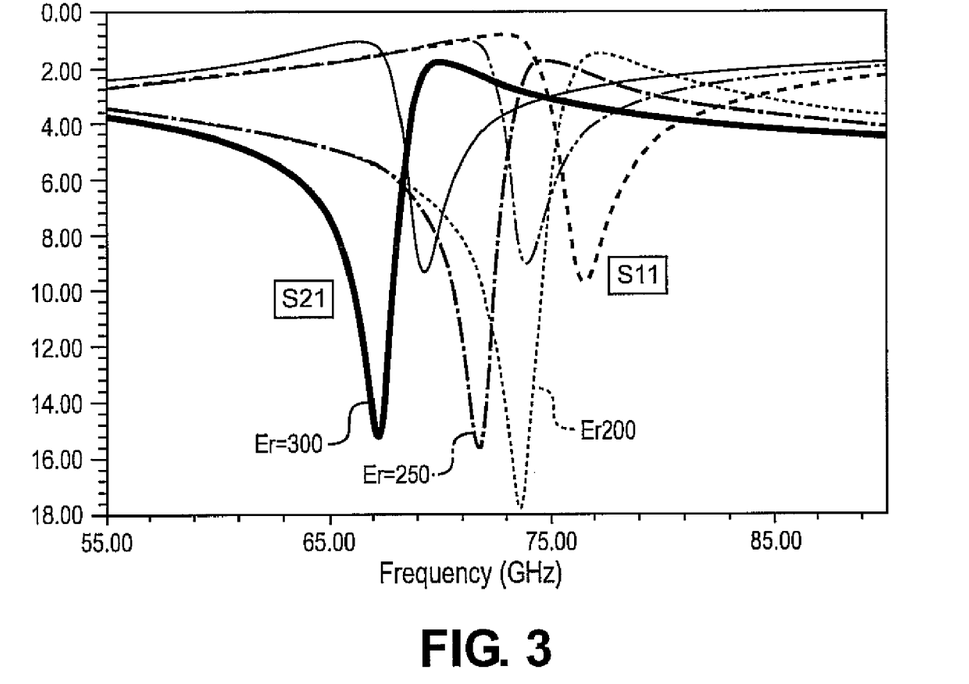
FIG. 3 shows variations in S-parameter by varying the relativity of the tuning capacitor.

FIG. 3 illustrates variation in the S-parameters $S_{21}$ and $S_{11}$ as a function of frequency and permittivity. The adjustable capacitor permittivity was adjusted from $\in_r=200$ to $\in_r=250$ and $\in_r=300$, which are typical values for thin film BST. The S-parameters were calculated using a simulation. The $S_{21}$ curves have the lower value minima, the frequency of the minima increasing as $\in_r$ decreases. The frequency range shown is 55 GHz to 90 GHz. However, examples of the present invention are not necessarily limited to illustrated ranges.

Figure 4:
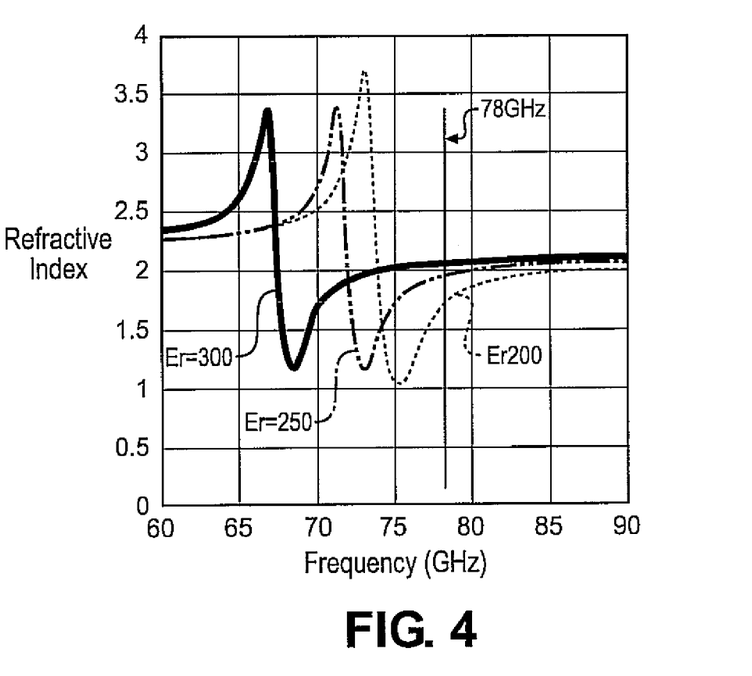
FIG. 4 shows the variations in refractive index corresponding to the S-parameter data of FIG. 3.

FIG. 4 shows refractive index curves as a function of frequency and permittivity, these curves being derived from those shown in FIG. 3. The curves show refractive index in the frequency range 60-90 GHz for $\in_r=200$, 250, and 300.

Figure 5:
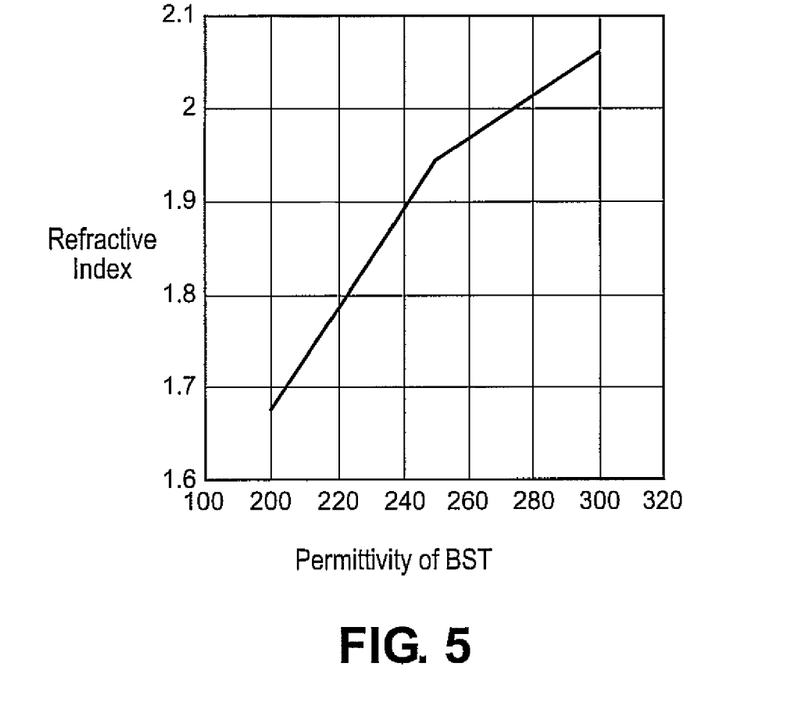
FIG. 5 shows variations in refractive index at 78 gigahertz.

FIG. 5 shows refractive index at 78 gigahertz as a function of permittivity, these stages also being determined from the data at FIG. 3. The refractive index range was found to be 0.3844, and the permittivity at 78 GHz increases as $\in_r$ increases (this is shown in both FIGS. 4 and 5).

Figure 6:
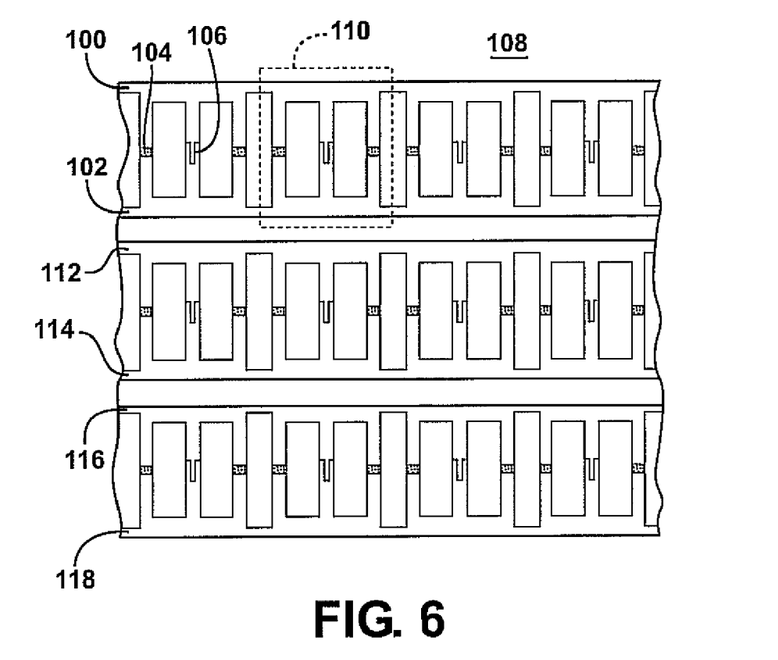
FIG. 6 shows a plurality of unit cells disposed on a substrate surface.

FIG. 6 illustrates an arrangement of a plurality of unit cells, which may be disposed on a planar substrate. Each unit cell comprises two adjustable capacitors such as 104 and an interdigitated capacitor such as 106. An electrical potential may be applied across the adjustable capacitor 104 using bias lines 100 and 102. The outline of a representative unit cell is shown at dashed line 110, and here this does not correspond to a physical structure but is a representation of an element of the repeating structure. The substrate surface 108 may be the surface of a polymer sheet or other substrate. A gradient index can be achieved by adjusting the applied bias potential as a function of spatial position. For example, first, second, and third bias voltages applied between bias line pairs 100 and 102, 112 and 114, and 116 and 118, respectively, may vary as a function of position. There may be an electrically-adjustable index increment between adjacent rows (the terms row and column are interchangeable).

It is also possible to configure bias connection lines to run in an orthogonal direction to that shown, if desired.

Figure 7:
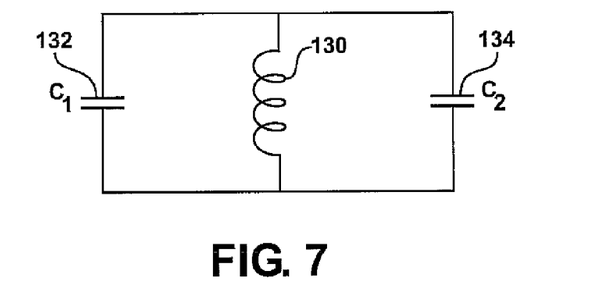
FIG. 7 shows an equivalent circuit for a resonator.

FIG. 7 illustrates an equivalent circuit for a unit cell such as that shown in FIG. 1, comprising first and second capacitors 132 and 134 and inductive element 130. The capacitance values and hence resonance frequency include contributions from adjustable and bias capacitors, and may be adjusted through tuning of adjustable capacitors. The inductive element may include contributions of the self inductance of the conducting strips. A metamaterial may comprise a plurality of unit cells, each having an equivalent circuit such as that shown in FIG. 7.

Figure 8A:
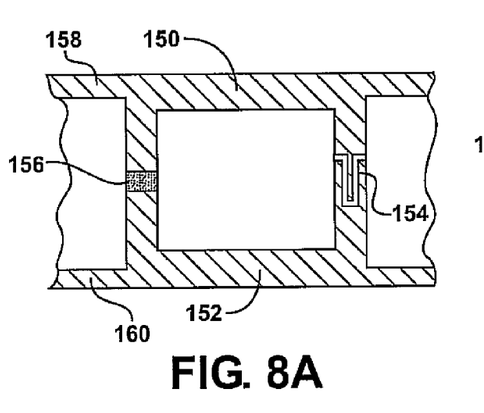
FIGS. 8A and 8B show alternative configurations.

FIG. 8A shows an alternative configuration, comprising first conducting element 150, second conducting element 152, bias capacitor 154, and adjustable capacitor 156. In this example the unit cell may be tuned through an electric potential applied across adjustable capacitor 156 through bias lines 158 and 160.

Figure 8B:
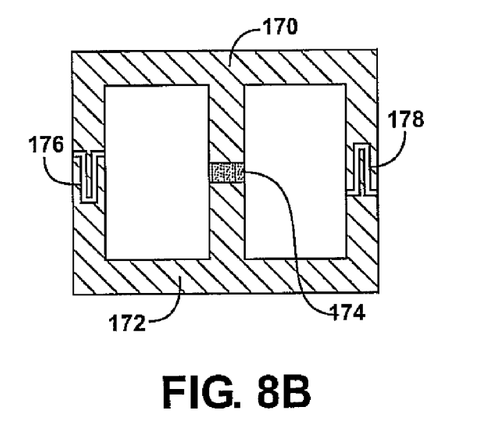

FIG. 8B shows an alternative configuration comprising first conducting element 170, second conducting element 172, adjustable capacitor 174, and first and second bias capacitors 176 and 178. In this example bias connections are not shown, and may be configured as desired.

In some examples, a baseline gradient in unit cell parameters may be obtained by varying the value of the bias capacitor over the extent of the metamaterial.

Figure 9A:
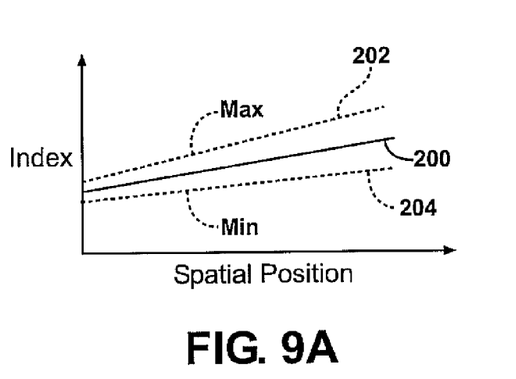
FIGS. 9A and 9B illustrate a possible spatial variation of bias capacitor values.

FIG. 9A shows a possible variation of index versus position, with the central line 200 (representing the mid-point of an available range) varying with position due to variations in value of the bias capacitor. Also, variations in index at any position can be obtained through variation of an applied potential, the variations being obtainable over a range between the upper and lower dashed lines indicated at 202 and 204. Hence, voltage control is possible from a baseline that may be present in fabricated variations in the metamaterial.

Figure 9B:
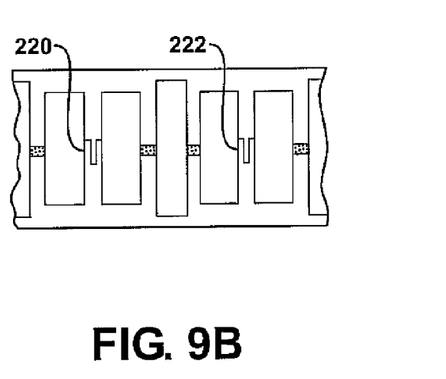

FIG. 9B represents how an index gradient can be built into a metamaterial through spatial variation in the dimensions of the bias capacitors 220 and 222. Other approaches are possible.

Further Discussion of Bias Capacitors

The bias capacitor may be any capacitor that need not have adjustable properties. The bias capacitor in some examples may be a simple in plane capacitor between adjacent conducting elements. If the bias capacitor is planar, this may facilitate fabrication of the metamaterial.

The use of interdigitated capacitors allows fabrication of planar capacitances having a larger capacitance than those possible without interdigitation. An interdigitated bias capacitor may be substantially invisible to RF signals propagating through the metamaterial. The use of interdigitation allows a more compact capacitor to be fabricated, but any generally planar form may be used. In some examples of the present invention, the bias capacitor need not be interdigitated.

The bias capacitor can be used to allow application of a direct flow across elements, whereas the bias capacitor has little effect on propagation of RF fields.

Further Discussion of Adjustable Capacitors

The adjustable capacitor may be any voltage adjustable capacitor. Voltage tuning may be obtained through application of bias potentials through bias lines such as those shown in FIG. 6. The bias potentials may be direct potentials, or alternating signals such as a low frequency (compared with the electromagnetic wave frequency) square wave or other signal. For example, an audio frequency square-wave bias potential may be used.

Adjustable capacitors also include capacitors having at least one electrode or other structure that is deformable by an electric field, such as a MEMS capacitor. Adjustable capacitors also include semiconductor devices, such as varactor diodes.

An example ferroelectric tunable material is barium strontium titanate, which has an electric field tunable permittivity. A bias potential may be applied across a capacitance gap of an electrically-coupled LC resonator, over a distance which may be less than 1 mm, and in some cases less than 100 microns. The direction of the applied electric field potential may be parallel to the surface of a planar substrate.

Other ferroelectric materials may be used, such as lead scandium tantalate (PST), other tantalates, lead zirconium titanate (PZT), lanthanum-doped lead zirconate titanate, other titanates, other perovskites, other inorganic ferroelectrics, and polymer ferroelectrics such as polyvinylidene difluoride (PVDF), other ferroelectrics, and combinations and derivatives of any such ferroelectric(s).

Electric field tunable materials also include phase change materials, such as chalcogenides including at least one chalcogen as a component. Examples include compounds of sulfur, selenium, and tellurium. Example compounds may include one or more component that is sulfur, selenium, or tellurium. Specific examples include compounds of germanium, antimony and tellurium such as $Ge_2Sb_2Te_5$ and antimony-selenium compounds such as $SbSe_x$. In some examples, the phase change material may remain in a certain form, such as crystalline, amorphous or mixed state, until another control input is used to change the state.

A tunable material may be deposited between the electrodes of an adjustable capacitor using one or more techniques, for example printing, vapor deposition, chemical deposition, physical deposition, and the like. In some examples a tunable element such as a varactor diode may be separately fabricated, and appropriately located and electrically connected to control electrical signals.

In other examples, a bias capacitor and/or adjustable capacitor may comprise a multilayer capacitor, for example an overleaf capacitor. However, some examples of the present invention include metamaterials in which all capacitors are planar structure, and may be generally coplanar, significantly minimizing process steps necessary for fabrication. For example, all capacitor electrodes may be provided by portions of coplanar patterned metal films. A metamaterial may be fabricated with conducting and voltage tunable elements substantially in a single plane supported by a generally planar substrate.

Examples of the present invention may also include multilayer structures, such as over-leaf capacitors.

Further Discussion of Substrates

Substrates may be dielectric substrates, preferably low loss at the frequency range of operation. Substrates may be planar dielectric substrates. A possible dielectric substrate is Rogers Ultralam™ 3000 series (Rogers Corporation, AZ) printed wiring boards (PWB). Example apparatus may comprise 1-50 layers, for example 20 metal layers, but the number of conducting layers and dielectric substrates is not limited by this example, and may be any number to obtain desired properties.

Substrates may comprise a polymer (such as a liquid crystal polymer), semiconductor (such as silicon, GaAs, and the lice), glass (such as borosilicate glass, such as Pyrex™, in particular Pyrex 7740 borosilicate glass, Corning, Inc., Corning, N.Y.), ceramic or glass-ceramic material, and the like.

Further Discussion of Conducting Patterns

Conducting patterns used to form resonators, bias lines, and the like may comprise electrically conducting films, for example metal films formed on a planar substrate. Conducting segments may be etched or otherwise patterned from a conducting film. Conducting patterns may comprise a metal, such as a noble metal (for example, Pt or Au), a platinum group metal such as Pt, other transition metal, or other metal such as Al. Conducting patterns may comprise conducting alloys, conducting polymers, doped semiconductors, and the like.

Resonators may be arranged in an array with a generally repeating pattern having a unit cell. The unit cell dimension may be in the range 10 microns-1 mm, e.g. 100 microns-1 mm, for example approximately 300-600 microns on a square side. The resonator may have a generally square shape with a side length less than the unit cell dimensions. The track width of the bias lines may be in the range 1 micron-500 microns, for example 10-100 microns. The air gap thickness and electrode separation of the adjustable capacitor may be in the range 0.5 microns-100 microns, for example in the range 1-20 microns. The conductor (e.g. metal) thickness of the conducting patterns may be in the range 0.1-10 microns.

Further Discussions of Applications and Other Aspects

Example apparatus include electrically tunable gradient index lens for millimeter-wave radiation, and may include a plurality of dielectric substrates, each dielectric substrate supporting an array of resonators. The resonators may have a parameter, such as bias capacitor value, that varies as a function of position over the substrate(s). Resonators may be generally ring shaped, square shaped, or otherwise configured. Examples also include millimeter wave sources and receivers, including radar apparatus.

Examples of the present invention include metamaterials (artificial dielectric materials) for use in any millimeter-wave application, for example absorbers, reflectors, beam steering devices, and the like. Lenses and artificial dielectric materials may be manufactured using mm-wave RF substrates such as a liquid crystal polymer (LCP). Examples of the present invention include materials and devices configured for automotive radar, such as 77 GHz operation.

In some examples of the present invention, beam steering devices may use bias voltages applied across resonators within the metamaterial that vary as a function of position, for example from one column to an adjacent column so as to provide a variable index or gradient index lens. A gradient index lens may be used to modify the direction of a beam, and the beam may be dynamically scanned in one or more planes.

Beam steering devices (or other beam control devices) may be refractive, the beam to be steered passing through the beam steering device, for example from one face to another. Such a configuration is useful for automotive applications, for example adaptive cruise control, parking assistance, hazard recognition systems, and the like.

A control signal may include a plurality of bias potentials applied to rows and/or columns, or in some examples may be as a result of a direct drive scheme in which a potential is directly applied to a first conducting segment relative to second conducting segment connected to a grounded terminal. A two-dimensional variation of effective index may be obtained.

Example metamaterials may comprise a single substrate supporting resonators formed from conducting segments, or may be multilayered structure having a multiple substrates. A multilayer metamaterial may provide a three-dimensional arrangement of unit cells. In such examples it may be possible to obtain a 3D variation of refractive index.

Tunable metamaterials may be used for beam steering of electromagnetic beams, RF applications, phase shifter, adjustable lenses, polarizers, and other optical elements. In this context the term optical element refers to an element used to control electromagnetic radiation. This is not limited to optical wavelengths as the term is sometimes used but may also include IR, terahertz, and other radio wavelengths. The bias lines may comprise parallel conducting stripes, which may also provide a polarizing effect on incident electromagnetic radiation.

Applications include electrically controlled beam steering for radar applications, for example, a metamaterial according to the present invention may be used in an automotive radar. The operating frequency may be approximately 77 gigahertz, or other suitable frequency. In such an application, the resonant frequency of any particular resonator may be selected to be somewhat less than the operational frequency, for example in the range of 40 to 60 gigahertz, so that the metamaterial acts as a positive refractive index material at the operating frequency. Micro-fabrication techniques may be used for fabrication of such metamaterials.

Active metamaterials allow beam steering using a low frequency control signal. A high resolution beam can be created by a lens and this beam can be steered by actively changing an index gradient in the metamaterial lens. Example applications also include collision avoidance radar for an automobile. Other applications include reflectors, absorbers, switchable devices for example transforming from reflectors to absorbers, and other electromagnetic beam control devices such as beam steering devices. Active scanning of a radar beam is possible in one or more planes.

A control signal for a tunable metamaterial may comprise a plurality of bias potentials. The magnitude of bias potentials may be controlled by a control circuit, for example comprising a processor, and may vary with time to allow dynamic control of a radar beam.

Examples of the present invention include metamaterials having planar split ELC resonators. The metamaterial includes a plurality of unit cells each including a resonator electric circuit set upon a dielectric substrate. An example active ELC metamaterial resonator includes a thin film voltage controlled capacitor. The variation of resonant frequency with applied bias voltage allows a controlled change of refractive index of the metamaterial. Bias lines to a voltage source and ground can be configured so as not to disturb electromagnetic wave propagation through the metamaterial.

The invention is not restricted to the illustrative examples described above. Examples described are exemplary, and are not intended to limit the scope of the invention. Changes therein, other combinations of elements, and other uses will occur to those skilled in the art. The scope of the invention is defined by the scope of the claims.

Having described our invention, we claim:

1. An apparatus, the apparatus being a metamaterial comprising:
    a substrate;
    a plurality of resonators supported on the substrate, each resonator including:
        a first conducting segment and a second conducting segment;
        at least one adjustable capacitor located between the first and second conducting segments; and
        at least one bias capacitor located between the first and second conducting segments; and
    bias lines configured so as to allow a bias potential to be applied between the first and second conducting segments so as to vary the capacitance of the adjustable capacitor,
    the plurality of resonators including a column of resonators supported on the substrate,
    the bias lines including a first bias line electrically connected to first conducting segment of each resonator in the column of resonators, and a second bias line electrically, connected to the second conducting segment of each resonator in the column of resonators,
    a bias potential applied between the first and second conducting segments adjusting all adjustable capacitors within the column of resonators,
    the plurality of resonators having bias capacitor values varying with spatial position on the substrate so as to provide a gradient index with no bias potential applied,
    the apparatus being an electrically tunable metamaterial.

2. The apparatus of claim 1, wherein the substrate is a planar substrate, the bias capacitor and the adjustable capacitor being generally coplanar.

3. The apparatus of claim 1, the resonator being an electrically coupled inductor-capacitor (ELC) resonator having a resonance frequency, the resonance frequency being tunable using the bias potential.

4. The apparatus of claim 1, wherein the adjustable capacitor comprises a material having an electrically tunable permittivity.

5. The apparatus of claim 4, wherein the adjustable capacitor comprises a ferroelectric material.

6. The apparatus of claim 1, the plurality of resonators being arranged in an array including the column of resonators.

7. The apparatus of claim 1, the first and second conducting segments each having a generally "E" shaped form, the generally "E" shaped form having three arms, the "E" shapes being arranged face to face, the first and second conducting segments bias capacitor located between the central arms of the E shapes, the remaining two arms each being separated by an adjustable capacitor.

8. An apparatus, the apparatus being a metamaterial comprising:
    a substrate, the substrate being a planar substrate;
    a plurality of resonators supported on the substrate, each resonator including:
        a first conducting segment and a second conducting segment;
        an adjustable capacitor located between the first and second conducting segments; and
        a bias capacitor located between the first and second conducting segments, the bias capacitor being a planar interdigitated capacitor; and
    bias lines configured so as to allow a bias potential to be applied between the first and second conducting segments so as to vary the capacitance of the adjustable capacitor,
    the plurality of resonators including a column of resonators supported on the substrate,
    the bias lines including a first bias line electrically connected to first conducting segment of each resonator in the column of resonators, and a second bias line electrically connected to the second conducting segment of each resonator in the column of resonators,
    a bias potential applied between the first and second conducting segments adjusting all adjustable capacitors within the column of resonators, the plurality of resonators having bias capacitor values varying with spatial position on the substrate so as to provide a gradient index with no bias potential applied, the apparatus being an electrically tunable metamaterial.

9. The apparatus of claim 8, the bias capacitor being an interdigitated capacitor.

10. The apparatus of claim 8, there being a plurality of adjustable capacitors between the first conducting segment and the second conducting segment.

11. The apparatus of claim 8, the adjustable capacitor, the bias capacitor, and the bias lines being formed from generally coplanar conducting elements.

12. The apparatus of claim 8, the plurality of resonators being supported on the substrate in an array having a plurality of columns of resonators.

13. The apparatus of claim 8, wherein bias capacitors have a capacitance that varies with spatial position on the substrate.

14. The apparatus of claim 8, wherein:
the substrate includes a polymer, an inorganic oxide, a glass, or a ceramic, and
the first conducting segment, second conducting segment, and the bias lines are formed from coplanar metal films.

15. The apparatus of claim 8, wherein each resonator includes a resonant loop structure,
the resonant loop structure having an equivalent circuit including an inductive component and a capacitive component,
the capacitive component being adjustable using the bias potential through adjustment of the adjustable capacitor,
the capacitive component also including a contribution from the bias capacitor,
the bias capacitor having a capacitance substantially independent of the bias potential.

16. The apparatus of claim 8, the bias lines comprising a pair of generally linear electrically conducting tracks,
a first linear track electrically interconnecting first electrically conducting segments of a plurality of resonators,
a second linear track interconnecting second electrically conducting segments of the plurality of resonators.

17. A method of fabricating an electrically tunable metamaterial, the method comprising:
providing a substrate supporting a conducting film,
patterning the conducting film so as to obtain a plurality of resonators, each resonator including a first conducting segment, a second conducting segment, a bias capacitor, and electrodes for an adjustable capacitor,
the bias capacitor and the adjustable capacitor being located between the first and second conducting segments; and
introducing a voltage-tunable material between the first and second conducting segments to form the adjustable capacitor, so as to obtain the electrically tunable metamaterial,
the plurality of resonators including a column of resonators supported on the substrate,
the metamaterial including a first bias line electrically connected to first conducting segment of each resonator in the column of resonators, and a second bias line electrically connected to the second conducting segment of each resonator in the column of resonators,
a bias potential applied between the first and second conducting segments adjusting all adjustable capacitors within the column of resonators,
the bias capacitor being an elongated interdigitated capacitor,
the first conducting segment, second conducting segment, bias capacitor, and adjustable capacitor being substantially coplanar.

18. The method of claim 17,
the substrate being a planar substrate,
the conducting film being a metal conducting film supported on a surface of the planar substrate.

* * * * *